United States Patent
Lin et al.

(10) Patent No.: US 11,574,143 B2
(45) Date of Patent: Feb. 7, 2023

(54) SYSTEMS AND METHODS WITH ROBUST CLASSIFIERS THAT DEFEND AGAINST PATCH ATTACKS

(71) Applicant: Robert Bosch GmbH, Stuttgart (DE)

(72) Inventors: Wan-Yi Lin, Wexford, PA (US); Mohammad Sadegh Norouzzadeh, Pittsburgh, PA (US); Jeremy Zieg Kolter, Pittsburgh, PA (US); Jinghao Shi, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 17/034,479

(22) Filed: Sep. 28, 2020

(65) Prior Publication Data
US 2022/0101046 A1 Mar. 31, 2022

(51) Int. Cl.
*G06K 9/00* (2022.01)
*G06K 9/62* (2022.01)
(Continued)

(52) U.S. Cl.
CPC ............ *G06K 9/6256* (2013.01); *G06K 9/628* (2013.01); *G06N 3/04* (2013.01); *G06N 3/084* (2013.01);
(Continued)

(58) Field of Classification Search
CPC ........ G06K 9/6256; G06K 9/628; G06N 3/04; G06N 3/084; G06N 3/0454; G06T 7/11; G06T 2207/20081; G06T 2207/20084; G06T 2207/20132; G06V 10/82; G06V 20/52; G06V 20/56
See application file for complete search history.

(56) References Cited

U.S. PATENT DOCUMENTS 11,010,640 B1 * 5/2021 Daniels ................ G06V 20/593
11,423,265 B1 * 8/2022 Chen ...................... G06T 11/20
(Continued)

OTHER PUBLICATIONS

Levine et al., "(De)Randomized Smoothing for Certifiable Defense against Patch Attacks," arXiv:2002.10733v1 [cs.LG], Feb. 25, 2020, pp. 1-14.
(Continued)

*Primary Examiner* — Ping Y Hsieh
(74) *Attorney, Agent, or Firm* — Kathy Takeguchi

(57) ABSTRACT

A system and method relate to providing machine learning predictions with defenses against patch attacks. The system and method include obtaining a digital image and generating a set of location data via a random process. The set of location data include randomly selected locations on the digital image that provide feasible bases for creating regions for cropping. A set of random crops is generated based on the set of location data. Each crop includes a different region of the digital image as defined in relation to its corresponding location data. The machine learning system is configured to provide a prediction for each crop of the set of random crops and output a set of predictions. The set of predictions is evaluated collectively to determine a majority prediction from among the set of predictions. An output label is generated for the digital image based on the majority prediction. The output label includes the majority prediction as an identifier for the digital image.

20 Claims, 9 Drawing Sheets

(51) Int. Cl.
*G06T 7/11* (2017.01)
*G06N 3/08* (2006.01)
*G06N 3/04* (2006.01)

(52) U.S. Cl.
CPC ...... *G06T 7/11* (2017.01); *G06T 2207/20081* (2013.01); *G06T 2207/20084* (2013.01); *G06T 2207/20132* (2013.01)

(56) References Cited

U.S. PATENT DOCUMENTS

2020/0311475 A1* 10/2020 el Kaliouby ........... G06V 40/23
2020/0334835 A1* 10/2020 Buibas ................... G06T 7/248

OTHER PUBLICATIONS

Lecuyer et al., "Certified Robustness to Adversarial Examples with Differential Privacy," arXiv:1802.03471v4 [stat.ML], May 29, 2019, pp. 1-18.

* cited by examiner

REFERENCE EXAMPLE

SYSTEMS AND METHODS WITH ROBUST CLASSIFIERS THAT DEFEND AGAINST PATCH ATTACKS

GOVERNMENT RIGHTS

At least one or more portions of this invention may have been made with government support under U.S. Government Contract No. 1190060-430433 awarded by Defense Advanced Research Projects Agency (DARPA). The U.S. Government may therefore have certain rights in this invention.

FIELD

This disclosure relates generally to machine learning systems, and more specifically to robust machine learning systems with defenses against patch attacks.

BACKGROUND

In general, machine learning systems, such as deep neural networks, are susceptible to adversarial attacks. These adversarial attacks may include physical attacks on the input data that cause machine learning systems to disrupt the predictions provided by the machine learning system. For example, an attacker may use a patch attack such that a classifier is provided with image data with a patch attack in which there are arbitrary and unbounded changes to pixels within a region of bounded size in the form of a patch. These patch attacks may cause the classifier to produce class data for the image data with the patch that is different than the class data that would be produced otherwise for that same image data without the patch. As a non-limiting and classic example, for instance, a patch attack may include the use of a sticker on a stop sign such that image data is produced with a patch (e.g., the sticker) that causes a classifier to misclassify the stop sign as being a yield sign, which may result in negative consequences and effects for at least a partially autonomous vehicle that uses this incorrect classification from the classifier.

While there is some work relating to defending against patch attacks, these works include a number of drawbacks, such as being relatively inefficient and time consuming to implement and/or run. For instance, there is some work that exhaustively creates image blocks in a sliding window manner. This sliding window approach takes a relatively long time to run. In addition, this sliding window approach tends to be computationally expensive to process since each image block is the same size as the original image. As another example, there is some work that generates image blocks by using an ablation process on the whole image such that each image block is the same size as the original image, thereby resulting in unnecessary computations. In addition, the work with the ablation process focuses on digital attacks in which all pixel values can be changed, which is not realizable in real-world applications without the machine learning system being compromised.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to training a machine learning system with respect to a random cropping framework to provide defenses against patch attacks. The method includes obtaining a first digital image from a non-transitory computer readable medium. The method includes generating a first set of location data via a random process. The first set of location data includes a random selection of locations on the first digital image. The method includes cropping the first digital image with respect to each location data of the first set of location data such that a first set of random crops is generated based on the first set of location data. The method includes creating a first training set that includes the first set of random crops of the first digital image. The method includes training the machine learning system using at least the first training set. The method includes updating parameters of the machine learning system based on a first set of predictions from the first training set.

According to at least one aspect, a computer-implemented method relates to generating machine learning predictions with defenses against patch attacks. The method includes obtaining sensor data from a sensor system that includes at least one sensor. The method includes obtaining a first digital image based on the sensor data. The method includes generating a first set of location data via a random process. The first set of location data includes a random selection of locations with respect to the first digital image. The method includes cropping the first digital image with respect to each location data of the first set of location data such that a first set of random crops is generated based on the first set of location data in which each crop of the first set of random crops is a different region of the first digital image. The method includes generating, via a machine learning system, a prediction for each crop of the first set of random crops to create a first set of predictions. The method includes evaluating the first set of predictions collectively to determine a majority prediction from among the first set of predictions. The method includes generating an output label that identifies the first digital image as possessing the majority prediction.

According to at least one aspect, a computer system relates to performing classifications with defenses against patch attacks. The computer system includes a sensor system, one or more non-transitory computer readable storage devices, and a processing system. The sensor system includes at least one sensor to capture sensor data. The one or more non-transitory computer readable storage devices include a machine learning system and a framework configured to defend against patch attacks. The processing system includes at least one computer processor that is communicatively connected at least to the one or more non-transitory computer readable storage devices. The processing system is configured to execute a method corresponding to the framework that includes obtaining a first digital image based on the sensor data. The method includes generating a first set of location data via a random process. The first set of location data includes a random selection of locations with respect to the first digital image. The method includes cropping the first digital image with respect to each location data of the first set of location data such that a first set of random crops is generated based on the first set of location data where each crop is a different region of the first digital image. The method includes classifying, via the machine learning system, each crop of the first set of random crops to create a first set of class predictions. The method includes evaluating the first set of class predictions collectively to determine a majority class from among the first set of class predictions. The method includes generating a class label that identifies the first digital image as belonging to the majority class.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
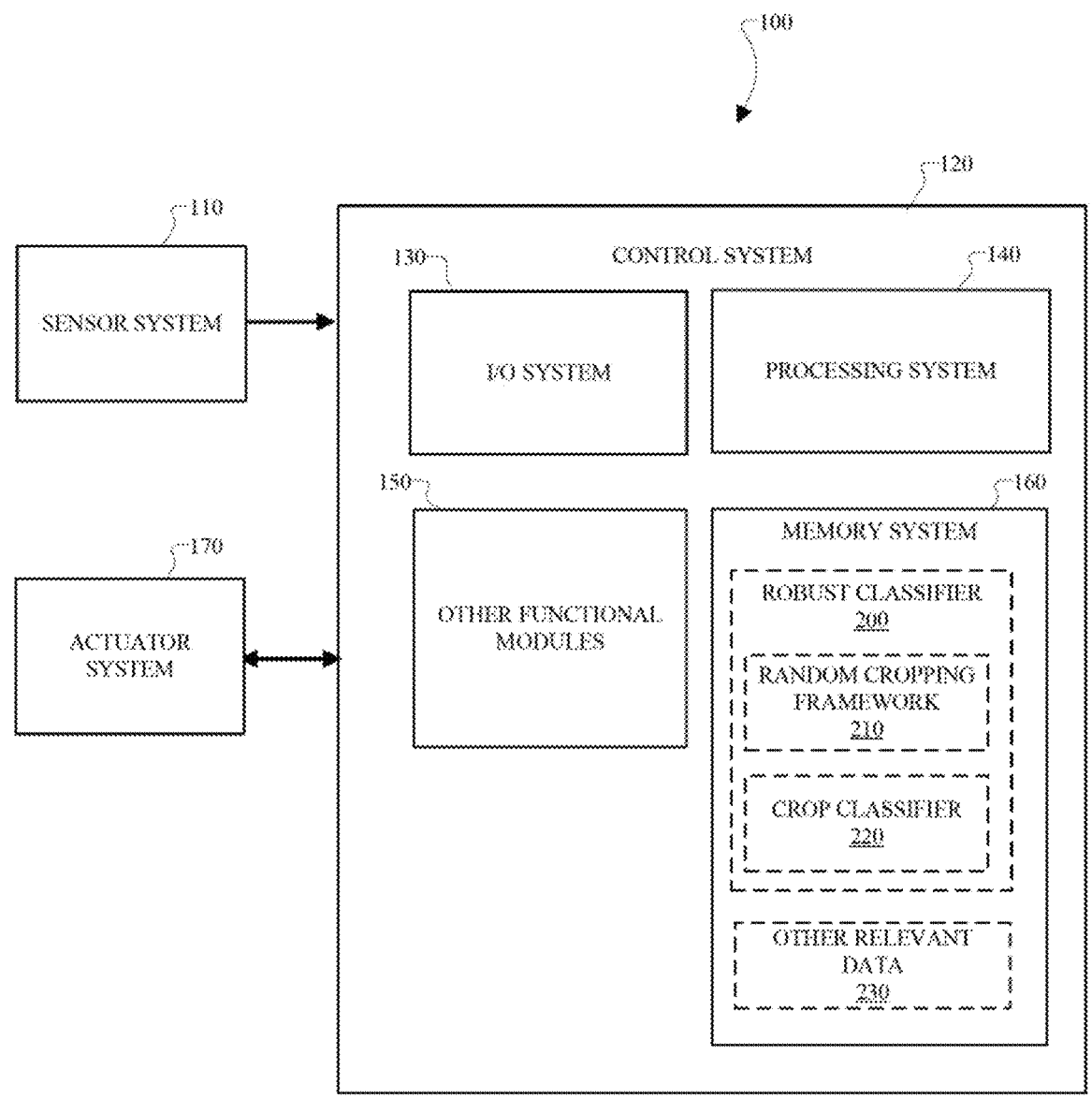
FIG. 1 is a diagram of a system that includes a robust classifier with defenses against patch attacks according to an example embodiment of this disclosure.

FIG. 1 is a diagram of a system 100, which is configured to include at least a robust classifier 200 with defenses against patch attacks. In this regard, the system 100 includes at least a sensor system 110, a control system 120, and an actuator system 170. The system 100 is configured such that the control system 120 controls the actuator system 170 based on sensor data from the sensor system 110. More specifically, the sensor system 110 includes one or more sensors and/or corresponding devices to generate sensor data. For example, the sensor system 110 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any combination thereof. Upon obtaining detections of its environment, the sensor system 110 is operable to communicate with the control system 120 via an input/output (110) system 130 and/or other functional modules 150, which includes communication technology.

The control system 120 is configured to obtain the sensor data directly or indirectly from one or more sensors of the sensor system 110. In this regard, the sensor data may include sensor data from a single sensor or sensor-fusion data from a plurality of sensors. Upon receiving input, which includes at least sensor data, the control system 120 is operable to process the sensor data via a processing system 140. In this regard, the processing system 140 includes at least one processor. For example, the processing system 140 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 140 is operable to generate output data (e.g., output label via the robust classifier 200) based on communications with memory system 160. In addition, the processing system 140 is operable to provide actuator control data to the actuator system 170 based on the output data.

The memory system 160 is a computer or electronic storage system, which is configured to store and provide access to various data to enable at least the operations and functionality, as disclosed herein. The memory system 160 comprises a single device or a plurality of devices. The memory system 160 includes electrical, electronic, magnetic, optical, semiconductor, electromagnetic, any suitable memory technology, or any combination thereof. For instance, the memory system 160 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 120 and/or processing system 140, the memory system 160 is local, remote, or a combination thereof (e.g., partly local and partly remote). For example, the memory system 160 is configurable to include at least a cloud-based storage system (e.g. cloud-based database system), which is remote from the processing system 140 and/or other components of the control system 120.

The memory system 160 includes at least a robust classifier 200. The robust classifier 200 is configured to be implemented, executed, and/or employed via the processing system 140. In this regard, the robust classifier 200 is configured to receive or obtain a digital image directly as input, which is sometimes referred to herein as the input image. The robust classifier 200 is configured to classify the digital image and generate output data (e.g., a class label) that identifies the class to which the digital image, as a whole, is deemed to belong.

The robust classifier 200 is advantageous in that the robust classifier 200 includes defenses against patch attacks. More specifically, the robust classifier 200 is configured to defend against small visible changes (e.g., stickers, etc.) to real world objects that would otherwise disrupt the classification of images of those objects. Additionally or alternatively, the robust classifier 200 is configured to defend against arbitrary changes to pixels of a bounded region in the form of a patch on a digital image.

Figure 10:
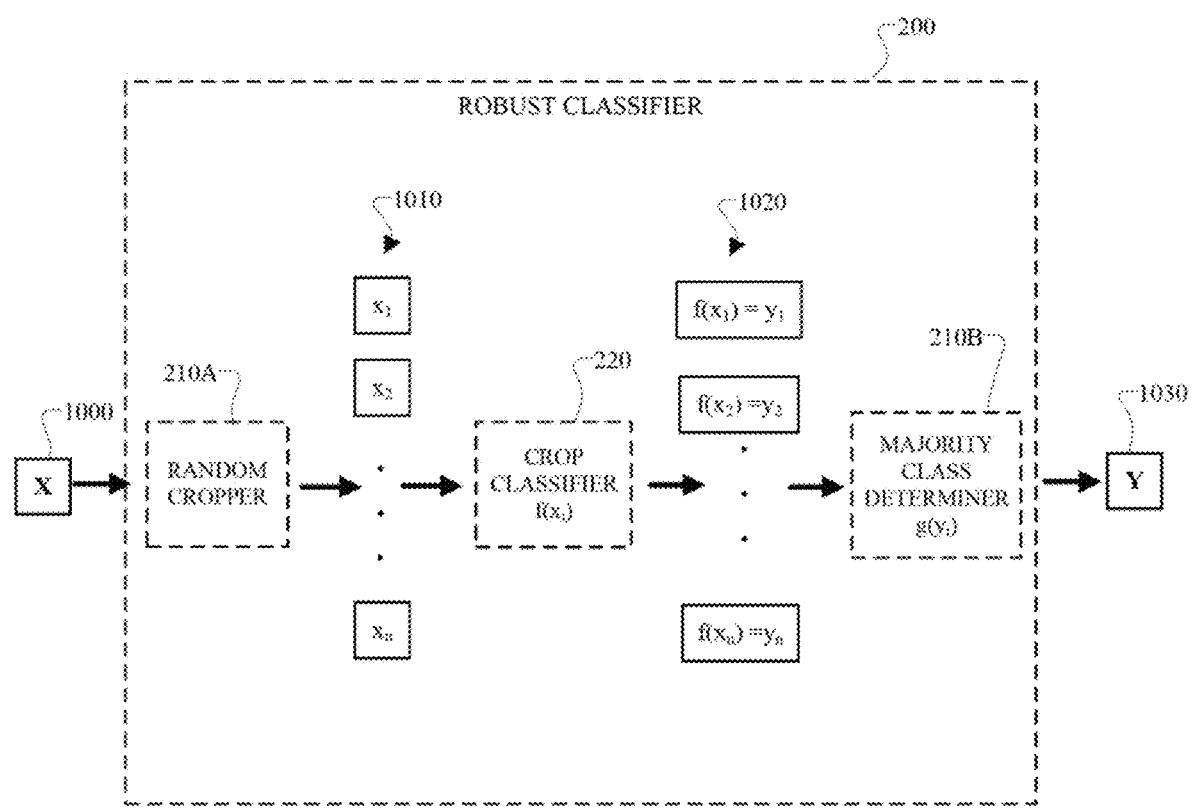
FIG. 10 is a flow diagram that shows an example of performing robust classification via the robust classifier of FIG. 1 according to an example embodiment of this disclosure.

The robust classifier 200 includes at least a random cropping framework 210 and a crop classifier 220. In general, the random cropping framework 210 performs a number of pre-processing steps for the crop classifier 220 and a number of post-processing steps for the crop classifier 220. For example, the random cropping framework 210 includes at least a random cropper 210A (FIG. 10) and a majority class determiner 210B (FIG. 10). More specifically, the random cropper 210A is configured to generate a set of random crops for an input image in accordance with certain criteria. The set of random crops is configured to include a suitable number of random crops (e.g., at least one percent of all possible crops for the input image). In general, the robust classifier 200 tends to perform better than when the set of random crops includes a larger number of random crops compared to when the set of random crops includes a smaller number of random crops. Also, the majority class determiner 210B is configured to receive the set of class data for the set of random crops from the crop classifier 220. The majority class determiner 210B is configured to determine the majority class upon evaluating the set of class data collectively. The majority class determiner 210B is configured to output a final class label for the input image that indicates that the input image belongs to the majority class.

The crop classifier 220 includes at least one machine learning system. For example, the crop classifier 220 includes at least an artificial neural network (ANN), such as a deep neural network (DNN). More specifically, the crop classifier 220 includes a convolutional neural network (CNN) or any suitable machine learning model. For instance, in FIG. 1, the crop classifier 220 includes a residual neural network (ResNet), VGGNet, LeNet, AlexNet, ZF Net, GoogLeNet/Inception, or any suitable machine learning model. The crop classifier 220 is configured to receive a set of random crops of an input image as its input on an individual basis or as a batch. The crop classifier 220 is trained to classify each crop of that input image into a selected class from among a group of classes based on its class prediction for that random crop. In this regard, for example, the group includes a total number of classes that is represented by Z, where Z is an integer number greater than 1. The crop classifier 220 is configured to generate class data for each crop based on its class prediction.

Furthermore, as shown in FIG. 1, the system 100 includes other components that contribute to operation of the control system 120 in relation to the sensor system 110 and the actuator system 170. For example, as shown in FIG. 1, the memory system 160 is also configured to store other relevant data 230, which relates to the operation of the system 100 in relation to one or more components (e.g., sensor system 110, the actuator system 170, etc.). Also, as shown in FIG. 1, the control system 120 includes the I/O system 130, which includes one or more interfaces for one or more I/O devices that relate to the system 100. For example, the I/O system 130 provides at least one interface to the sensor system 110 and at least one interface to the actuator system 170. Also, the control system 120 is configured to provide other functional modules 150, such as any appropriate hardware technology, software technology, or any combination thereof that assist with and/or contribute to the functioning of the system 100. For example, the other functional modules 150 include an operating system and communication technology that enables components of the system 100 to communicate with each other as described herein. With at least the configuration discussed in the example of FIG. 1, the system 100 is applicable in various technologies.

Figure 2:
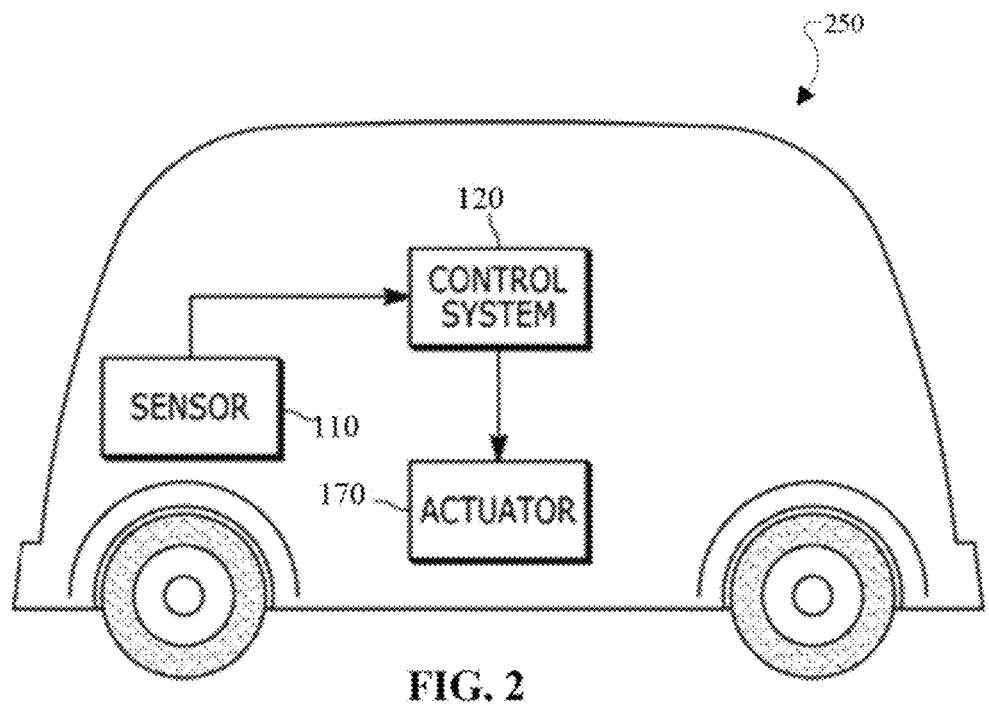
FIG. 2 is a diagram of the system of FIG. 1 with respect to mobile machine technology according to an example embodiment of this disclosure.

FIG. 2 is a diagram of the system 100 with respect to mobile machine technology 250 according to an example embodiment. As a non-limiting example, the mobile machine technology 250 includes at least a partially autonomous vehicle. In FIG. 2, the mobile machine technology 250 is at least a partially autonomous vehicle, which includes a sensor system 110. The sensor system 110 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. Additionally or alternatively, the sensor system 110 may include an information system for determining a state of the actuator system 170. For example, the information system may include a weather information system, which is configured to determine a present or future state of the weather in an environment of the vehicle. The sensor system 110 is configured to provide sensor data to the control system 120.

The control system 120 is configured to obtain image data, which is based on sensor data or sensor-fusion data from the sensor system 110. The control system 120 is configured to detect objects in a vicinity of the vehicle based on the sensor data. More specifically, the control system 120 is configured to provide input images to the robust classifier 200. The robust classifier 200 is configured to classify objects in the input images. For instance, as a non-limiting example, the robust classifier 200 is configured to classify an input image as having an object that belongs to the "stop sign" class, whereby a patch may be present or absent from the input image. In general, the robust classifier 200 is configured to classify the input image into the most relevant class that the robust classifier 200 determines that the input image most likely represents from among a group of classes (e.g., pedestrians, trees, other vehicles, road signs, etc.). The control system 120 is configured to generate actuator control data in response to the classification of the object as "stop sign." In this case, the actuator system 170 is configured to actuate at least the braking system to stop the vehicle upon receiving the actuator control data. In this regard, the actuator system 170 is configured to include a braking system, a propulsion system, an engine, a drivetrain, a steering system, or any number and combination of actuators of the vehicle. The actuator system 170 is configured to control the vehicle so that the vehicle follows rules of the roads and avoids collisions based at least on the classifications provided by the robust classifier 200.

In addition, as another non-limiting example, the mobile machine technology 250 includes at least a partially autonomous robot. For example, the robot is configured to carry out one or more functions. As a non-limiting example, the robot may be configured as a partially autonomous lawn mower or a partially autonomous cleaning robot. In this regard, the actuator system 170 is configured to control, drive, steer, or brake so that the robot avoids collisions with detected objects, as identified by the robust classifier 200.

Furthermore, as yet another non-limiting example, the mobile machine technology 250 includes at least a partially autonomous robot in the form of a gardening robot. In this example, the control system 120 is configured to provide the robust classifier 200 with input images based on sensor data. The robust classifier 200 is configured to classify these input images to identify a state of the plants in the environment and/or the species of plants in the environment. The control system 120 is further configured to generate actuator control data based classifications associated with the plants (e.g., state of plants or identified species of plants) so that the actuator system 170 is configured to provide a suitable quantity of gardening chemicals and/or treatments to the plants based on their classifications.

Figure 3:
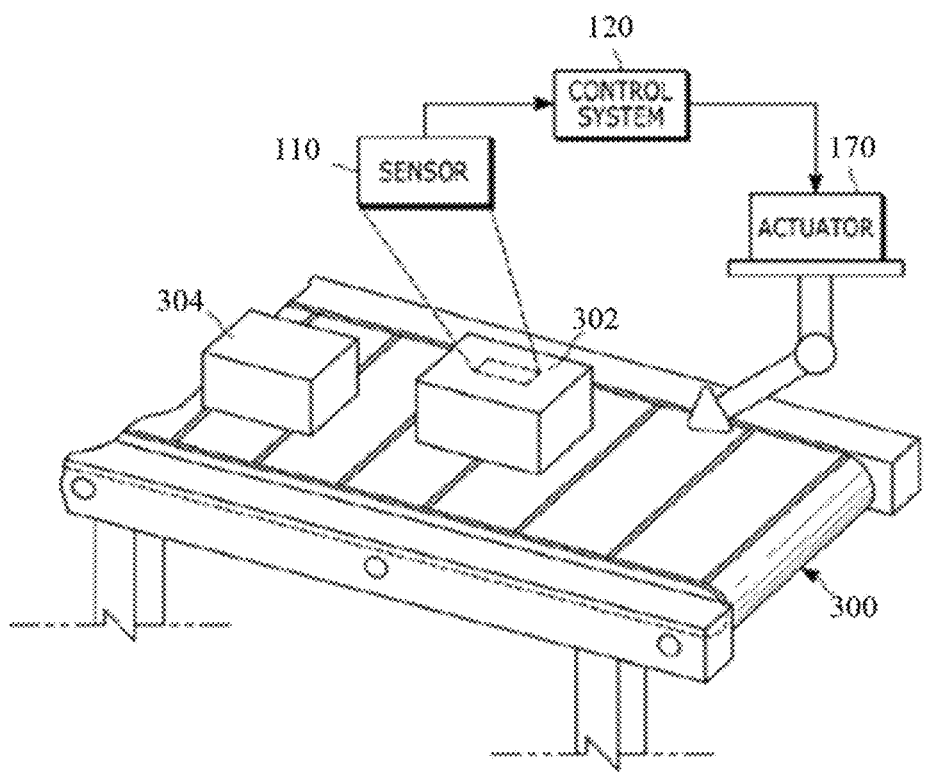
FIG. 3 is a diagram of the system of FIG. 1 with respect to manufacturing technology according to an example embodiment of this disclosure.

FIG. 3 is a diagram of the system 100 with respect to manufacturing technology 300 according to an example embodiment. As a non-limiting example, the manufacturing technology 300 includes a punch cutter, a cutter, a gun drill, or any suitable type of manufacturing machine. In FIG. 3, the sensor system 110 includes at least one image sensor or optical sensor. The control system 120 is configured to obtain image data from the sensor system 110. The robust classifier 200 is configured to classify an input image, which includes a state of a manufacturing product. For example, the control system 120 may be configured to classify a current state 302 of the manufacturing product from among various states in the manufacturing process via the robust classifier 200. In this example, the control system 120 is configured to generate actuator control data in response to the classification of the current state 302 of the manufacturing product based on properties captured by the sensor system 110. In addition, as a non-limiting example, in response to the actuator control data, the actuator system 170 is configured to actuate a next manufacturing step so that the manufacturing product achieves a next state 304 of the manufacturing process based on the current state 302 of the manufacturing product as determined by the robust classifier 200.

Figure 4:
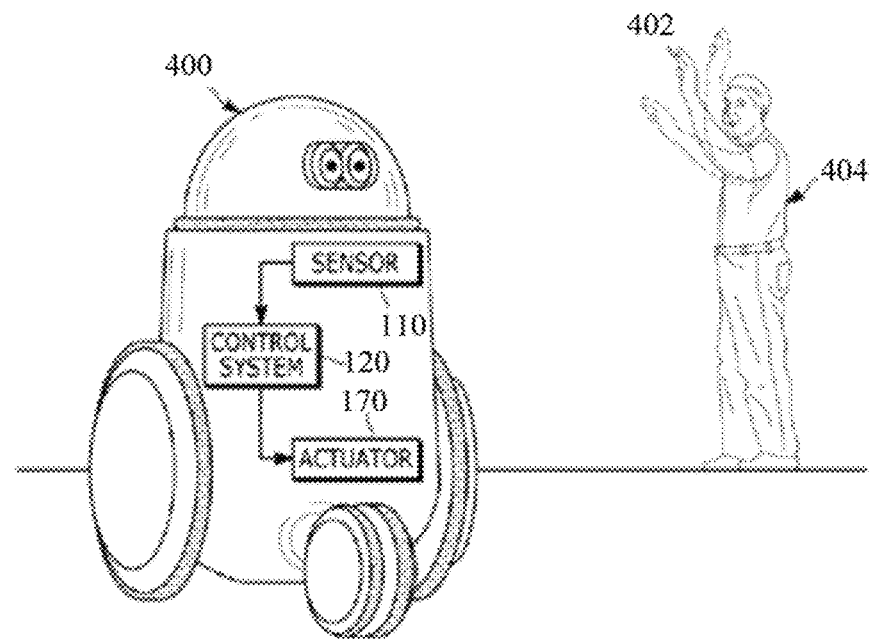
FIG. 4 is a diagram of the system of FIG. 1 with respect to robot technology and/or automated personal assistant technology according to an example embodiment of this disclosure.

FIG. 4 is a diagram of the system 100 with respect to robot technology 400 according to an example embodiment. As a non-limiting example, the robot technology 400 includes at least an automated personal assistant or any suitable type of automated robot. For instance, as one non-limiting example, the robot technology 400 is configured to control a domestic appliance, such as a washing machine, a stove, a vacuum cleaner, an oven, a microwave, a dishwasher, or any suitable apparatus. The sensor system 110 includes at least an optical sensor, an image sensor, an audio sensor, any suitable sensor, or any combination thereof. For instance, the sensor system 110 may include at least an image sensor and an audio sensor. In this case, the sensor system 110 is configured to detect at least hand gestures 402 and audio commands from a user 404. The control system 120 is configured to obtain the image data, video data, and audio data from the sensor system 110. The control system 120 is configured to obtain commands from the audio data. In addition, the control system 120 is configured to detect gestures from the image data and the video data. For example, the control system 120 is configured provide a detected gesture as an input image to the robust classifier 200. For example, the control system 120 is configured to classify the input image as including a gesture that belongs to the "stop gesture" class. The control system 120 is configured to generate actuator control data in response to the classification (e.g. class label of "stop gesture") provided by the robust classifier 200. In addition, as a non-limiting example, in response to the actuator control data, the control system 120 is configured to control the actuator system 170 to stop an operation of the domestic appliance when the robust classifier 200 identifies the input image as belonging to the "stop gesture."

Figure 5:
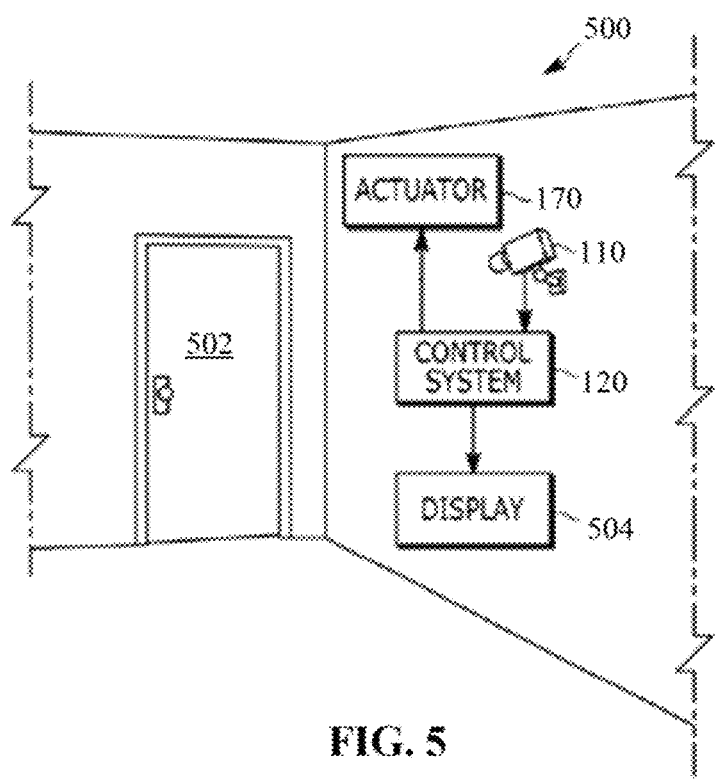
FIG. 5 is a diagram of the system of FIG. 1 with respect to security technology according to an example embodiment of this disclosure.

FIG. 5 is a diagram of the system 100 with respect to security technology 500 according to an example embodiment. As a non-limiting example, the security technology 500 includes at least a monitoring system, a control access system, a surveillance system, or any suitable type of security apparatus. For instance, as one example, FIG. 5 may relate to security technology 500, which is configured to physically control a locked state and an unlocked state of the door 502. The sensor system 110 includes at least an image sensor that is configured to capture image data or video data. The control system 120 is configured to obtain the image data or video data from the sensor system 110. The control system 120 is configured to detect facial images. The control system 120 is configured to provide a facial image as an input image to the robust classifier 200. For example, the control system 120 may classify the input image as including a facial image that belongs to a selected class from among classes that include a "person A" class, a "person B" class, a "person C," and so forth. The control system 120 is configured to generate actuator control data in response to the classification (class label of "person N") provided by the robust classifier 200. In addition, as a non-limiting example, in response to the actuator control data, the control system 120 is configured to control the actuator system 170 to unlock the door 502 when the robust classifier 200 identifies the input image as belonging to "person N."

As another example, FIG. 5 may relate to security technology 500, which is configured to provide surveillance for the region near the door 502. The sensor system 110 includes at least an image sensor that is configured to capture image data or video data relating to scenes for the region near the door 502. The control system 120 is configured to obtain the image data or video data from the sensor system 110. The control system 120 is configured to classify scenes. The control system 120 is configured provide a scene as an input image to the robust classifier 200. For example, the control system 120 may be configured to classify the scene as being "suspicious" or "not suspicious." The control system 120 is configured to generate actuator control data in response to the classification (e.g. class label of "suspicious") provided by the robust classifier 200. In addition, as a non-limiting example, in response to the actuator control data, the control system 120 is configured to control the actuator system 170 to highlight and display the input image on the display 504 when the robust classifier 200 identifies the input image as belonging to the "suspicious" class and/or transmit the input image to the appropriate authorities.

Figure 6:
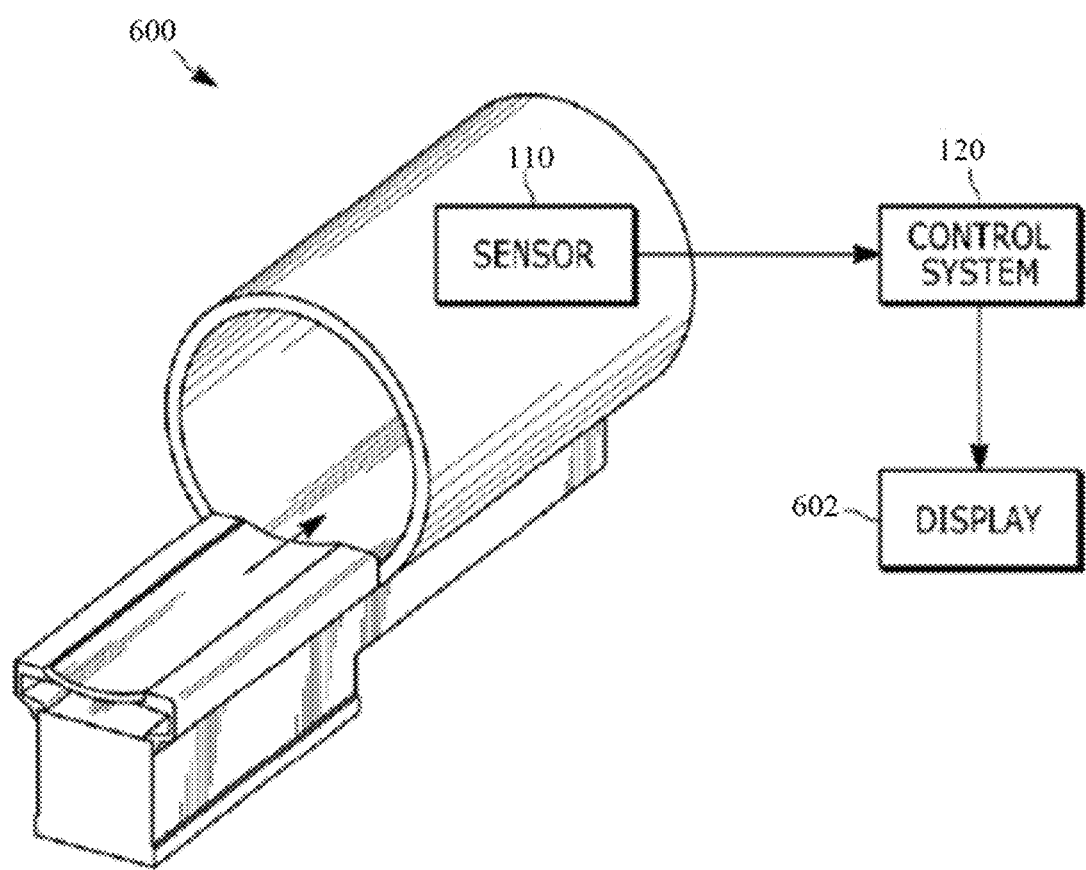
FIG. 6 is a diagram of the system of FIG. 1 with respect to imaging technology according to an example embodiment of this disclosure.

FIG. 6 is a diagram of the system 100 with respect to imaging technology 600 according to an example embodiment. As a non-limiting example, the imaging technology 600 includes a magnetic resonance imaging (MRI) apparatus, an x-ray imaging apparatus, an ultrasonic apparatus, a medical imaging apparatus, or any suitable type of imaging apparatus. In FIG. 6, the sensor system 110 includes at least one imaging sensor. The control system 120 is configured to obtain image data from the sensor system 110. The control system 120 is configured to classify an input image, which is based on at least a part or all of the image data that is generated based on the sensor system 110. For example, the control system 120 may classify the input image as being "anomalous." The control system 120 is configured to generate actuator control data in response to the classification (e.g. class label of anomalous) provided by the robust classifier 200. In addition, as a non-limiting example, in response to the actuator control data, the control system 120 is configured to control the actuator system 170 to at least highlight the input image and display the highlighted input image on a display 602.

Figure 7:
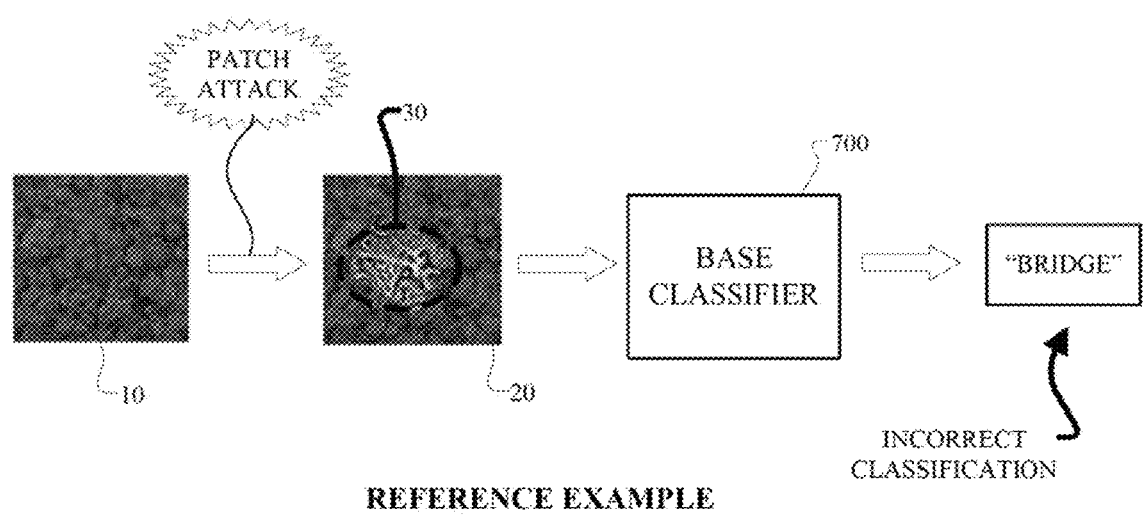
FIG. 7 is a conceptual diagram of a reference example of a classification process that is performed by a base classifier that does not include defenses against patch attacks according to an example embodiment of this disclosure.
Figure 8:
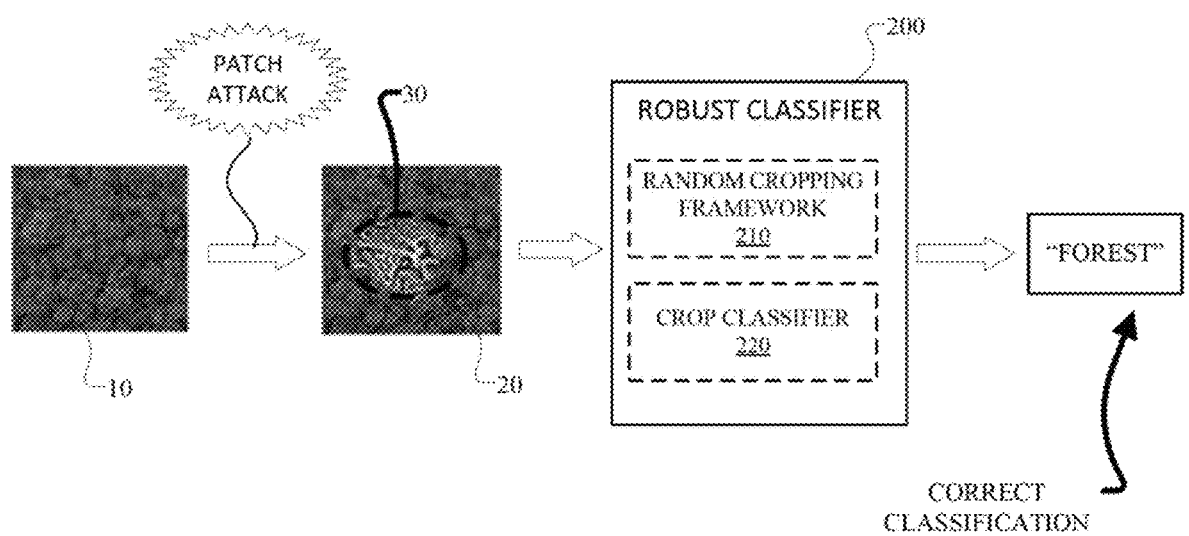
FIG. 8 is a conceptual diagram of an example of a classification process performed by the robust classifier of FIG. 1 according to an example embodiment of this disclosure.

FIGS. 7-8 provide comparative examples of a base classifier 700, which has no defenses against patch attacks, and the robust classifier 200, which has defenses against patch attacks. When viewed together, FIGS. 7-8 highlight the advantages of the robust classifier 200 over the base classifier 700, particularly when there is a patch attack. In addition, FIGS. 7-8 also illustrate a "clean version" of a digital image 10 before a patch attack and a "corrupted version" of the digital image 20 after the patch attack. As shown, the digital image 10 and the digital image 20 include the same base image of a forest, but the digital image 20 further includes a patch 30 from the patch attack.

In the reference example, the base classifier 700 is configured to receive the digital image 20 as input. The base classifier 700 processes this single digital image 20 in its entirety and classifies this digital image 20 as belonging to the "BRIDGE" class. As shown in FIG. 7, the digital image 20 is actually an image of a forest, but further includes a patch 30, which disrupts the classification of the digital image 20 via the base classifier 700. Without defenses against such patch attacks, the base classifier 700 is unsuccessful in providing the correct classification data for the digital image 20 when the patch 30 is present.

In contrast, the robust classifier 200 is configured to successfully classify the digital image as belonging to the "FOREST" class. More specifically, the robust classifier 200 is configured to receive the digital image 20 as input. The random cropping framework 210 is configured to pre-process the digital image 20 to create a set of random crops from the digital image 20. The crop classifier 220 is configured to classify each of the random crops of the set. The random cropping framework 210 is configured to obtain the class data for each crop and create a set of class data for post-processing. During post-processing, the random cropping framework 210 is configured to evaluate the set of class data in a collective manner and determine a majority class from among the set of class data. In this non-limiting example, the random cropping framework 210 is configured to output a class label that indicates that the digital image 20 belongs to the "FOREST" class upon determining that the "FOREST" class is the majority class. As demonstrated by this illustrative example, the robust classifier 200 provides a number of safeguards to ensure that patch attacks do not result in the misclassification of digital images with patches.

Figure 9:
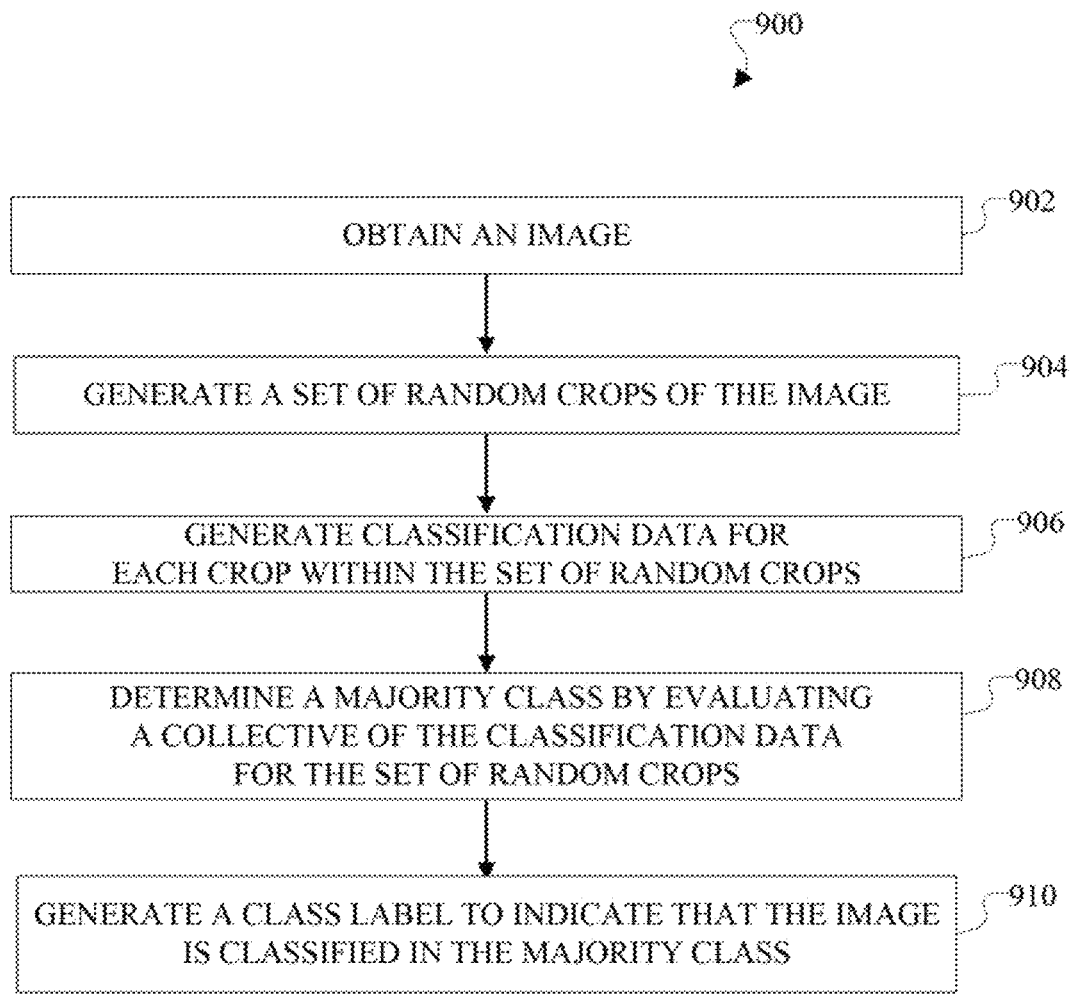
FIG. 9 is a flow chart of an example of a method for performing robust classification via the robust classifier of FIG. 1 according to an example embodiment of this disclosure.
Figure 11:
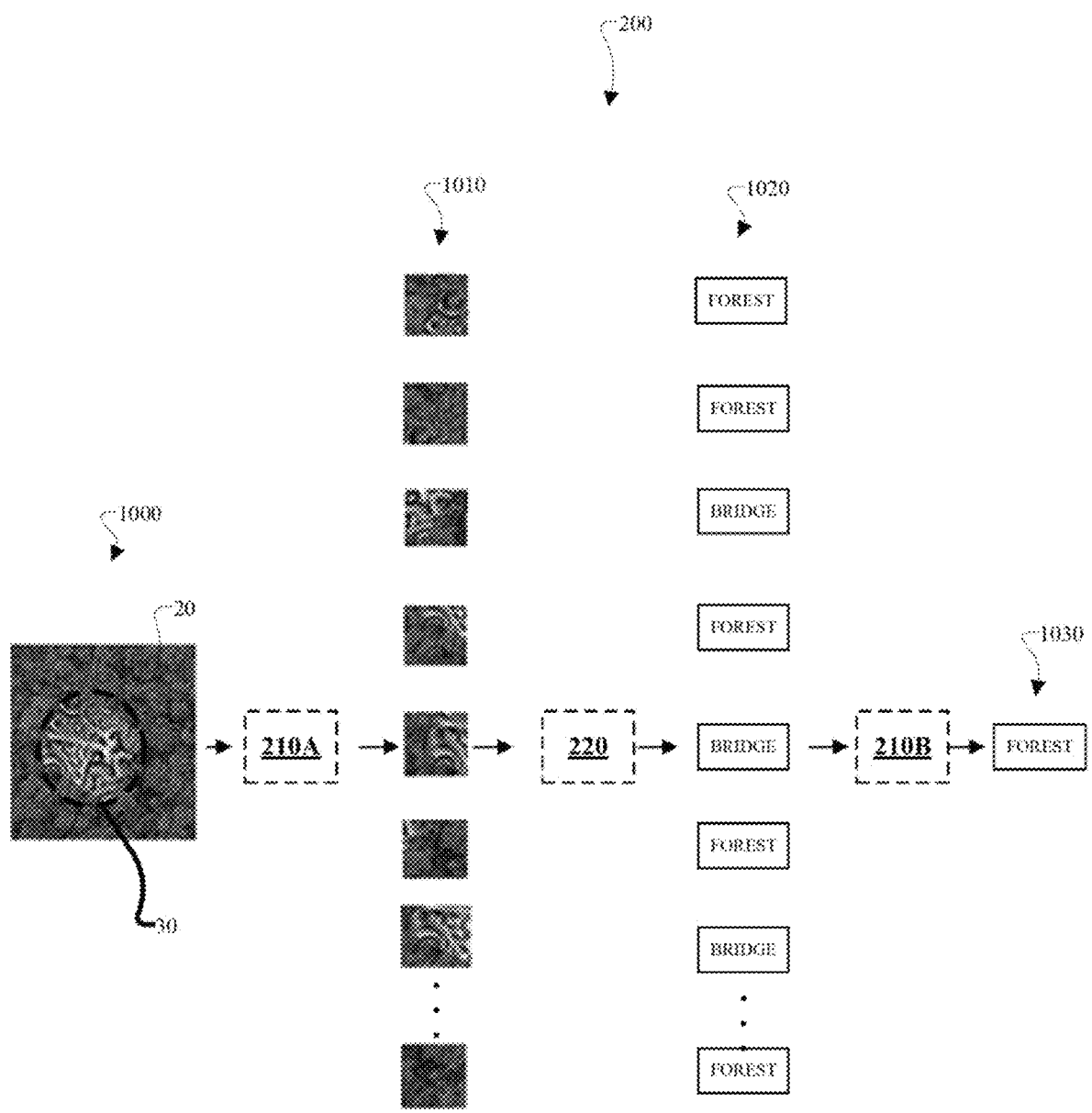
FIG. 11 is a conceptual diagram that shows an example of performing robust classification via the robust classifier of FIG. 1 with non-limiting examples at various stages according to an example embodiment of this disclosure.

FIG. 9-11 illustrate examples of a method 900 for performing robust classification via the robust classifier 200 according to an example embodiment. The method 900 is performed by the robust classifier 200 via at least one processor of the processing system 140. More specifically, FIG. 9 illustrates a flow chart that outlines a number of steps for performing robust classification. Additionally or alternatively, the method 900 may include more or less steps than those steps shown in FIG. 9 provided that such modifications provide the functions and/or objectives as described herein. Meanwhile, FIGS. 10-11 are conceptual flow diagrams that respectively show a general example and a concrete example of data instances at various stages of the robust classifier 200. FIG. 11 also provides a more detailed view of the example described with respect to FIG. 8.

At step 902, the method 900 includes obtaining input data. For example, in FIG. 10, the input data is an input image 1000, which is represented by "X" and which may or may not include a patch attack. The processing system 140 is configured to obtain the input image 1000 directly or indirectly from a sensor system (e.g., camera), a non-transitory computer readable medium, any suitable electronic device, or any combination thereof. The input image 1000 has an image size that is defined by a first dimension of $M_1$ and a second dimension of $M_2$. The first dimension relates to the height of the input image 1000 and the second dimension relates to a width of the input image 1000. $M_1$ and $M_2$ may be different values or the same values. More specifically, in FIG. 11, the input image 1000 is the digital image 20 (with an image size defined by $M_1$ and $M_2$) that includes the patch 30. In this case, the patch 30 happens to be equal to or less than the maximum patch size, which is defined by a first dimension represented by $P_1$ and a second dimension represented by $P_2$ and which ensures that the robust classifier 200 performs relatively well in view of the patch 30.

At step 904, the method 900 includes randomly cropping the input image 1000 to generate a set of random crops 1010. The set of random crops 1010 include $\{x_1, x_2, \ldots x_n\}$, where $x_i$ represents a crop of the input image 1000 and 'n' represents a total number of random crops. The processing system 140 is configured to perform cropping at various locations of the input image 1000 in a random manner. For example, as shown in FIGS. 10-11, these various locations are chosen randomly via the random cropper 210A. More specifically, for instance, the random cropper 210A is configured to implement a random process that randomly selects an image location (or a specific pixel) from among all possible image locations (or possible pixels) of the input image 1000 that can serve as a center of a cropping region and that can create a suitable and feasible crop for the crop classifier 220. In this regard, the processing system 140 is configured to select a location at random from among all possible locations, which corresponds to all possible crops as indicated in equation 3 since each crop is based on a possible cropping location. The processing system 140 performs the cropping to generate a set of random crops of the image in which each crop has a first dimension represented by $C_1$ and a second dimension represented by $C_2$. $C_1$ is less than $M_1$. $C_2$ is less than $M_2$. More specifically, as one example, $C_1$ and $C_2$ are computed respectively to satisfy equation 1 and equation 2, as expressed below.

$$M_1 > P_1 + 2C_1 \quad [1]$$

$$M_2 > P_2 + 2C_2 \quad [2]$$

As described above, the processing system 140 is configured to generate crops at a set of random locations of the input image 1000 in which each crop has a first dimension $C_1$ that is at least less than half of the difference of $M_1 - P_1$. In addition, each crop has a second dimension $C_2$ that is at least less than half of the difference of $M_2 - P_2$. As indicated in equations 1 and 2, $C_1$ is determined such that $M_1$ is at least twice $C_1$. $C_2$ is determined such that $M_2$ is at least twice $C_2$. In general, the processing system 140 generates random crops in which each crop may be significantly smaller in size than a crop that is generally used for data augmentation. In addition, the processing system 140 generates random crops that are of a suitable size such there is sufficient image data available for the crop classifier 220 to perform a function $f(x_i)$. If the crop size is too small, then there is less image data that the processing system 140, via the crop classifier 220, is able to use to perform a function $f(x_i)$.

The processing system 140 is configured to generate a set of random crops 1010 that is a subset of all of the possible crops of the input image. For instance, in this example, the total number of all possible crops is represented by $N_{ALL}$ in equation 3. For an input image, the processing system 140 is configured to generate a total of 'n' crops, where 'n' represents an integer number such that $1 < n \leq N_{ALL}$. In general, a greater number of crops provides a greater level of confidence in the results obtained from the function of g(y). In one example, the processing system 140 is configured to generate a set of random crops 1010 where the number ('n') of crops within this set comprises at least one percent of all possible $N_{ALL}$ crops of the input image 1000 to provide effective results that are above threshold criteria based on empirical data. With respect to the total number ($N_{ALL}$) of all possible crops, the processing system 140 is configured to calculate $N_{ADV}$, which represent the total number of random crops that may overlap the patch attack. In an example embodiment, the processing system 140 is configured to compute $N_{ADV}$ via equation 4, which is based on the assumptions provided in equations 1 and 2.

$$N_{ALL} = (M_1 - C_1 + 1) \times (M_2 - C_2 + 1) \quad [3]$$

$$N_{ADV} = (P_1 + C_1 - 1) \times (P_2 + C_2 - 1) \quad [4]$$

At step 906, the method 900 includes providing each crop of the set of random crops 1010 as input to the machine learning system to generate a respective prediction for each crop. More specifically, with respect to FIGS. 10-11, for instance, the processing system 140 feeds each crop into the crop classifier 220. The crop classifier 220 is configured to predict a class to classify each crop. In this example, the crop classifier 220 is configured to classify each crop into a selected class from among 'Z' classes, where 'Z' represents an integer number greater than one. For example, if the crop classifier 220 predicts that a first crop has a relatively high or greater likelihood of belonging to a first class from among the group of classes, then the crop classifier 220 is configured to generate a class label for the first crop that includes first class data. Alternatively, if the crop classifier 220 predicts that the first crop has a relatively high or greater likelihood of belonging to a fifth class from among this same group of classes, then the crop classifier 220 is configured to provide the first crop with the class label that includes the fifth class data. In addition, the method 900 includes obtaining the prediction for each crop and generating a set of predictions corresponding to the set of random crops 1010. More specifically, for example, the method 900 includes obtaining class data for each crop of the set of random crops 1010 and creating a set of class data 1020. The set of class data 1020 includes $\{y_1, y_2, \ldots y_n\}$, where $y_i$ represents the class data for the corresponding crop $x_i$ and n represents the total number of class data and/or the total number of crops.

At step 908, the method 900 includes evaluating the set of predictions that is associated with the set of random crops 1010 to determine a majority prediction. More specifically, for instance, with respect to FIGS. 10-11, the processing system 140 is configured to determine a majority class via the function $g(y_i)$ from among the set of class data 1020. As one example, the processing system 140, via the majority class determiner 210B, is configured to enact a voting process in which each class prediction (e.g., class data) within the set of class data 1020 is given a vote. In this case, the majority class refers to a specific class with a greatest number of votes (or highest frequency of occurrence) within the set of class data 1020. For instance, as a simplified example for discussion purposes, in FIG. 11, the majority class determiner 210B determines that the majority class is "FOREST" since there are 5 votes for the forest class and 3 votes for the bridge class from among the set of class data 1020. As another example, the processing system 140, via the majority class determiner 210B, is configured to use a logit function or a softmax function to determine the majority class based on the set of class data 1020. In this regard, each classification data (i.e., class prediction) within the set of classification data is provided with values via the logit function or softmax function. These values are then used in computing and determining the majority class. Furthermore, in any of these examples, if more than one class is determined to be the majority class (e.g., a tie between two classes), then the processing system 140 is configured to select one class from among those majority classes so that there is a single majority class that is assigned to the input image 1000.

At step 910, the method 900 includes generating an output label to indicate that the final prediction for the input image 1000 is the majority prediction determined at step 908. In this case, the final prediction relates to the input image 1000, as a whole, and not to just one crop of the input image 1000. More specifically, referring to FIGS. 10-11, as an example, the method 900 includes generating a class label 1030 to indicate that the input image 1000 (i.e., the digital image 20 with the patch 30) belongs to the class of "FOREST" based on the majority class determination at step 908. For instance, as shown in at least FIGS. 10-11, even though the crop classifier 220 only classified a set of random crops 1010 of the input image 1000, the processing system 140 is configured to provide a single class label 1030 (represented as "Y"), which classifies the input image 1000 (represented as "X") in its entirety as belonging to the forest class in a correct manner even in the presence of a patch attack.

Also, in an example embodiment, the processing system 140 is configured to assess whether or not the presence of a patch attack disrupted the final prediction (e.g., the class label 1030) of the input image 1000 by evaluating at least one condition. As an example, for instance, the processing system 140 is configured to make this assessment by determining whether or not equation 5 is satisfied. In equation 5, $N_1$ represents the number of crops that are classified in the majority class that is ranked first based on the greatest number of votes (or greatest likelihood scores). Meanwhile, $N_2$ represents the number of crops that are classified in the next majority class that is ranked second based on the next greatest number of votes (or the next greatest likelihood scores). The processing system 140 is configured to determine whether or not equation 5 is satisfied to determine whether or not the final classification of the input image 1000 is reasonably valid.

$$N_{ADV} < \frac{N_1 - N_2}{2} \quad [5]$$

Figure 12:
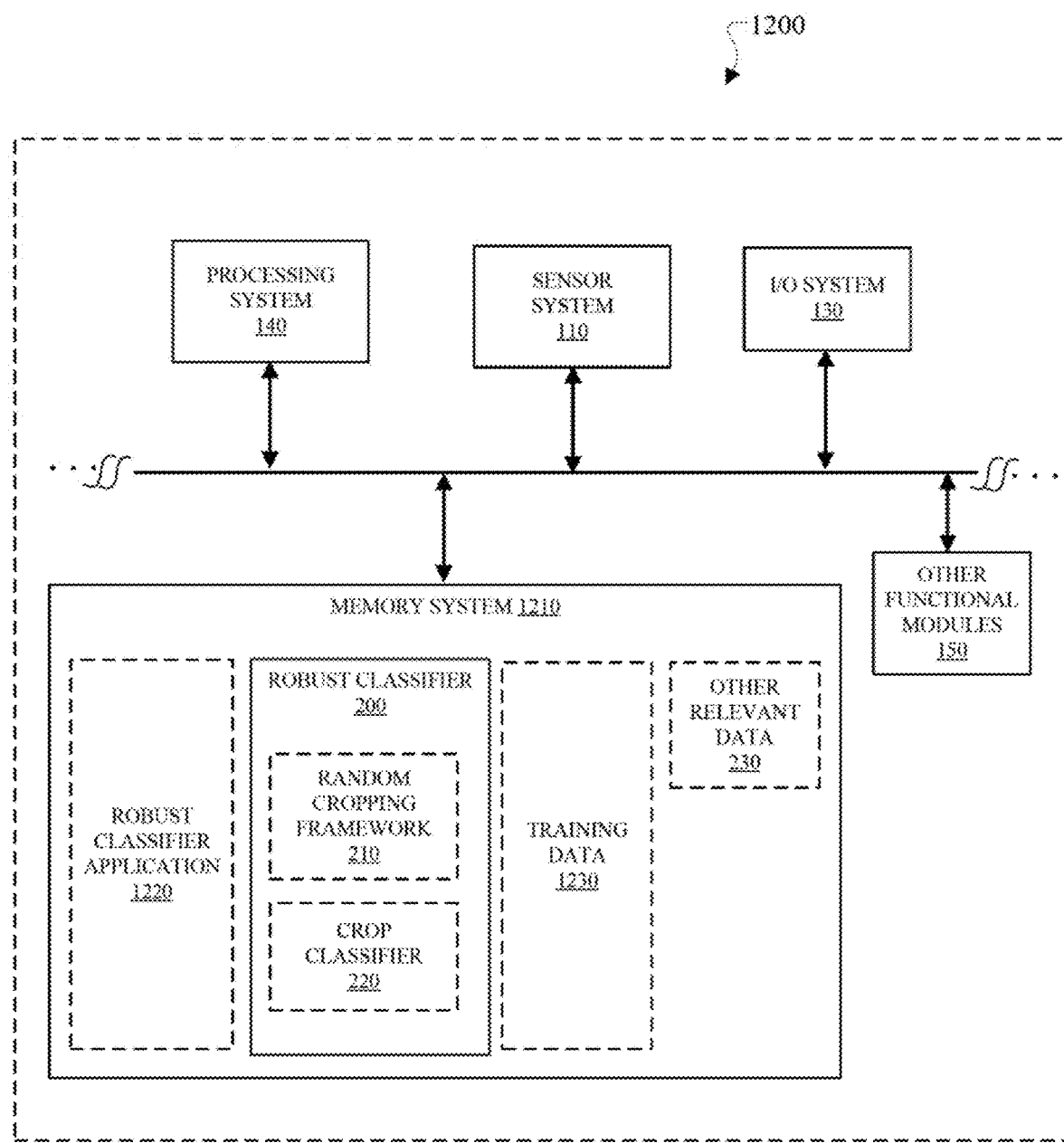
FIG. 12 is a diagram of a computer system that is configured to at least train the robust classifier of FIG. 1 according to an example embodiment of this disclosure.

FIG. 12 is a diagram of a system 1200 for training at least the crop classifier 220 in the context of the robust classifier 200 according to an example embodiment. The system 1200 includes at least a processing system 140. The processing system 140 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 140 is operable to provide the functionality as described herein.

The system 1200 includes at least a memory system 1210, which is operatively connected to the processing system 140. In an example embodiment, the memory system 1210 includes at least one non-transitory computer readable medium, which is configured to store and provide access to various data to enable at least the processing system 140 to perform the operations and functionality, as disclosed herein. In an example embodiment, the memory system 1210 comprises a single device or a plurality of devices. The memory system 1210 can include electrical, electronic, magnetic, optical, semiconductor, electromagnetic, or any suitable storage technology that is operable with the system 100. For instance, in an example embodiment, the memory system 1210 can include random access memory (RAM), read only memory (ROM), flash memory, a disk drive, a memory card, an optical storage device, a magnetic storage device, a memory module, any suitable type of memory device, or any combination thereof. With respect to the processing system 140 and/or other components of the system 1200, the memory system 1210 is local, remote, or a combination thereof (e.g., partly local and partly remote). For example, the memory system 1210 can include at least a cloud-based storage system (e.g. cloud-based database system), which is remote from the processing system 140 and/or other components of the system 1200.

The memory system 1210 includes at least a robust classifier application 1220, the robust classifier 200, training data 1230, and other relevant data 230, which are stored thereon. The robust classifier application 1220 includes computer readable data that, when executed by the processing system 140, is configured to implement a training procedure to train the robust classifier 200 to provide the functions as described in at least FIGS. 9-11. As an example, for instance, the robust classifier application 1220 is configured to train at least the crop classifier 220 to classify crops ($x_i$) of an input image ("X") and provide class data ($y_i$) as output data based on class predictions. The computer readable data can include instructions, code, routines, various related data, any software technology, or any number and combination thereof.

In addition, the robust classifier 200 includes at least one machine learning system. More specifically, as shown in FIG. 12, the robust classifier 200 includes the crop classifier 220, which is a machine learning system. For instance, the crop classifier 220 includes at least an artificial neural network (ANN), such as a deep neural network (DNN). More specifically, the crop classifier 220 includes a convolutional neural network (CNN) or any suitable machine learning model. For instance, in FIG. 1, the crop classifier 220 includes a residual neural network (ResNet), VGGNet, LeNet, AlexNet, ZF Net, GoogLeNet/Inception, or any suitable image classification model.

Also, the training data 1230 includes a sufficient amount of image data that can be used as the input images ("X") for the crop classifier 220. The training data 1230 includes clean images with no patch attacks. The training data 1230 also includes adversarial images with patch attacks so that adversarial training can be performed on the crop classifier 220. In addition, the training data 1230 includes various annotations, various class label data, various loss data, various weight data, and various parameter data, as well as any related machine learning data that enables the system 1200 to train the crop classifier 220 to perform the functions as described herein while meeting certain performance criteria. Meanwhile, the other relevant data 230 provides various data (e.g. operating system, etc.), which enables the system 1200 to perform the functions as discussed herein.

In an example embodiment, as shown in FIG. 12, the system 1200 is configured to include at least one sensor system 110. The sensor system 110 includes one or more sensors. For example, the sensor system 110 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any combination thereof. The sensor system 110 is operable to communicate with one or more other components (e.g., processing system 140 and memory system 1210) of the system 1200. More specifically, for example, the processing system 140 is configured to obtain the sensor data directly or indirectly from one or more sensors of the sensor system 110. Upon receiving any sensor data during the training process to supplement the training data 1230, the processing system 140 is configured to process this sensor data in connection with the robust classifier application 1220 and the robust classifier 200.

In addition, the system 1200 includes other components that contribute to the training of the robust classifier 200, particularly the crop classifier 220. For example, as shown in FIG. 12, the memory system 1210 is also configured to store other relevant data 230, which relates to operation of the system 100 in relation to one or more components (e.g., sensor system 110, I/O system 130, and other functional modules 150). In addition, the I/O system 130 includes an I/O interface and may include one or more devices (e.g., display device, keyboard device, speaker device, etc.). Also, the system 1200 includes other functional modules 150, such as any appropriate hardware technology, software technology, or combination thereof that assist with or contribute to the functioning of the system 1200. For example, the other functional modules 150 include communication technology that enables components of the system 1200 to communicate with each other as described herein. With at least the configuration discussed in the example of FIG. 12, the system 1200 is operable to train the crop classifier 220 to receive a crop, classify the crop, and generate a class label for that crop based on its class prediction. In addition, the system 1200 is configured to update parameters of the crop classifier 220 during the training process. The system 1200 is also configured to back-propagate loss data relating to the function $g(y_i)$ when a logit function or a soft max function is used to determine the majority prediction (e.g., majority class).

As described herein, the embodiments provide a number of advantages and benefits. For example, the embodiments are advantageous in providing robust frameworks with machine learning models that are configured to defend against patch attacks. As another example, the embodiments include obtaining random samplings of crops from an input image, which is quicker and more efficient than other approaches involving sliding windows and ablation techniques that use image blocks of the same size as the original image. Moreover, these embodiments make it difficult for adversaries to lean how to devise successful patch attacks since they will not be able to predict the set of random crops that will be generated with respect to an input image at any given instance. In this regard, the set of random crops is different at different instances for the same input image and/or different input images. In addition, the embodiments provide these random crops as input data to the crop classifier 220, which reduces the number of computations and improves the speed of classifying the input data as the size of crops of the images is significantly less than the size of the images themselves. Also, there is less effort involved in training the machine learning system, such as the crop classifier 220, to classify crops compared to classifying the images themselves. As an advantage, the embodiments include training processes, which possess a number of similarities with standard training procedures for image classification models. Furthermore, empirical data suggests that some embodiments achieve best performance with a set of random crops 1010 that includes a minimum of 1% of all possible crops of the image. Moreover, the embodiments result in robust classifiers 200, which are advantageously trained to classify crops of an input image and provide a class label for the input image itself with a high level of confidence and accuracy even if that input image includes a patch attack. These robust classifiers 200 are configured to be applied to various applications that involve classifying input data.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, the illustrated embodiments relate to examples of machine learning systems that perform classification tasks. In addition, this disclosure is configured to be extended to machine learning systems that perform other tasks. As a non-limiting example, the machine learning task may include object detection, image segmentation, image modification, or any suitable task. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system with respect to a random cropping framework to provide defenses against patch attacks, the method comprising:
   obtaining a first digital image from a non-transitory computer readable medium;
   generating a first set of location data via a random process, the first set of location data including a random selection of locations on the first digital image;
   cropping the first digital image with respect to each location data of the first set of location data such that a first set of random crops is generated based on the first set of location data;
   creating a first training set that includes the first set of random crops of the first digital image;
   training the machine learning system using at least the first training set; and
   updating parameters of the machine learning system based on a first set of predictions from the first training set.

2. The method of claim 1, wherein the machine learning system includes at least a convolutional neural network (CNN).

3. The method of claim 1, further comprising:
   evaluating the first set of predictions in a collective manner;
   generating an output label for the first digital image based on the first set of predictions for the first set of random crops;
   determining a loss associated with the output label for the first digital image; and
   back propagating the loss through the machine learning system.

4. The method of claim 1, further comprising:
   obtaining a second digital image in which the second digital image is a version of the first digital image that further includes a patch;
   generating a second set of location data via the random process, the second set of location data including another random selection of locations on the second digital image;
   cropping the second digital image with respect to each location data of the second set of location data such that a second set of random crops is generated based on the second set of location data;
   creating a second training set that includes the second set of random crops of the second digital image;
   training the machine learning system using at least the second training set; and
   updating the parameters of the machine learning system based on a second set of predictions from the second training set.

5. The method of claim 4, wherein:
   the patch includes arbitrary changes to pixels of a bounded region of the second digital image; and
   a crop size of each crop is greater than a patch size of the patch of the second digital image.

6. The method of claim 1, wherein:
   each crop within the first set of random crops has a crop size that is less than an image size of the first digital image; and
   a cropping dimension of the crop size is determined such that an image dimension of the image size is greater than twice the cropping dimension.

7. The method of claim 1, wherein each location data of the first set of location data is a center of a respective region for creating a corresponding crop of the first digital image.

8. A computer-implemented method for generating machine learning predictions with defenses against patch attacks, the method comprising:
   obtaining sensor data from a sensor system that includes at least one sensor;
   obtaining a first digital image based on the sensor data;
   generating a first set of location data via a random process, the first set of location data including a random selection of locations with respect to the first digital image;
   cropping the first digital image with respect to each location data of the first set of location data such that a first set of random crops is generated based on the first set of location data in which each crop of the first set of random crops is a different region of the first digital image;

generating, via a machine learning system, a respective prediction for each crop of the first set of random crops to create a first set of predictions;

evaluating the first set of predictions collectively to determine a majority prediction from among the first set of predictions; and generating an output label that identifies the first digital image as possessing the majority prediction.

9. The computer-implemented method of claim 8, wherein the evaluating further includes:

enacting a voting process to determine the majority prediction in which each prediction from among the first set of predictions is given a vote; and establishing the majority prediction from among the first set of predictions based on a greatest number of votes.

10. The computer-implemented method of claim 8, wherein the evaluating step further includes:

using a logit function or a softmax function with respect to the first set of predictions to determine the majority prediction; and establishing the majority prediction from among the first set of predictions based on the logit function or the softmax function.

11. The computer-implemented method of claim 8, wherein:

each crop within the first set of random crops has a crop size that is less than an image size of the first digital image; and a cropping dimension of the crop size is at least two times smaller than an image dimension of the image size.

12. The computer-implemented method of claim 8, further comprising:

obtaining a second digital image in which the second digital image is a version of the first digital image that further includes a patch;

generating a second set of location data via the random process, the second set of location data including another random selection of locations with respect to the second digital image;

cropping the second digital image with respect to each location data of the second set of location data such that a second set of random crops is generated based on the second set of location data where each crop of the second set of random crops is a different region of the second digital image;

generating, via the machine learning system, a respective prediction for each crop of the second set of random crops to create a second set of predictions;

evaluating the second set of predictions collectively to determine the majority prediction from among the second set of predictions; and generating the output label that identifies the second digital image as possessing the same majority prediction as the first digital image.

13. The computer-implemented method of claim 12, wherein:

the patch includes arbitrary changes to pixels of a bounded region of the second digital image; and a crop size of each crop is greater than a patch size of the patch of the second digital image.

14. The computer-implemented method of claim 8, wherein the machine learning system includes at least a convolutional neural network (CNN).

15. A system for performing classifications with defenses against patch attacks, the system comprising:

a sensor system including at least one sensor to capture sensor data;

one or more non-transitory computer readable storage devices including a machine learning system and a framework configured to defend against patch attacks; and a processing system including at least one computer processor that is communicatively connected at least to the one or more non-transitory computer readable storage devices, the processing system being configured to execute a method corresponding to the framework that includes:

obtaining a first digital image based on the sensor data;

generating a first set of location data via a random process, the first set of location data including a random selection of locations with respect to the first digital image;

cropping the first digital image with respect to each location data of the first set of location data such that a first set of random crops is generated based on the first set of location data where each crop is a different region of the first digital image;

classifying, via the machine learning system, each crop of the first set of random crops to create a first set of class predictions;

evaluating the first set of class predictions collectively to determine a majority class from among the first set of class predictions; and generating a class label that identifies the first digital image as belonging to the majority class.

16. The system of claim 15, wherein the evaluating further includes:

enacting a voting process to determine the majority class in which each class prediction from among the first set of class predictions is given a vote; and establishing the majority class from among the first set of class predictions based on a greatest number of votes.

17. The system of claim 15, wherein the evaluating further includes:

using a logit function or a softmax function with respect to the first set of class predictions to determine the majority class; and establishing the majority class from among the first set of class predictions based on the logit function or the softmax function.

18. The system of claim 15, wherein:

each crop within the first set of random crops has a crop size that is less than an image size of the first digital image; and a cropping dimension of the crop size is at least two times smaller than an image dimension of the image size.

19. The system of claim 15, wherein the processing system is configured to execute the method corresponding to the framework that further includes:

obtaining a second digital image in which the second digital image is a version of the first digital image that further includes a patch;

generating a second set of location data via the random process, the second set of location data including another random selection of locations with respect to the second digital image;

cropping the second digital image with respect to each location data of the second set of location data such that a second set of random crops is generated based on the second set of location data where each crop of the second set of random crops is a different region of the second digital image;

classifying, via the machine learning system, each crop of the second set of random crops to create a second set of class predictions;

evaluating the second set of class predictions collectively to determine the majority class from among the second set of class predictions; and generating the class label that identifies the second digital image as belonging to the same majority class as the first digital image.

20. The system of claim 19, wherein:

the patch includes arbitrary changes to pixels of a bounded region of the second digital image; and a crop size of each crop is greater than a patch size of the patch of the second digital image.

* * * * *